United States Patent

[11] 3,565,305

[72] Inventor Paul Belokin, Jr.,
6919 W. 43rd St., Berwyn, Ill. 60402
[21] Appl. No. 828,159
[22] Filed May 27, 1969
[45] Patented Feb. 23, 1971

[54] CAR CARRIER MEANS
8 Claims, 8 Drawing Figs.
[52] U.S. Cl. .................................................. 224/42.1,
190/41, 190/51, 190/57
[51] Int. Cl. ..................................................... B60r 9/04
[50] Field of Search .......................................... 190/51, 57,
41; 224/42.1 (A), 42.1 (B), 42.1 (C), 42.1 (C1),
42.1 (E), 42.1 (F), 42.1 (G), 42.1 (LM), 29

[56] References Cited
UNITED STATES PATENTS
2,405,361 8/1946 Langford et al. ............. (190/41)
3,000,419 9/1961 Morrison ..................... 224/42.1(E)X FOREIGN PATENTS
1,011,725 12/1965 Great Britain ................ 224/42.1F Primary Examiner—Albert J. Makay
Attorney—Harbaugh and Thomas ABSTRACT: A carrier for attachment to the trunk lid or top of a car is described, characterized by molded plastic construction, inner compartmentation and a combination liner and hinged cover having a peripheral zipper closure. Means are provided to affix the carrier to a flat or curved surface of a vehicle on swivel mountings. The carrier is strong, weather proof and is mounted on the vehicle with the only access panel concealed and adjacent surface of the car so as to discourage theft. In one embodiment a molded handle is provided recessed in one edge of the carrier defining compartments on each side between the liner and the inner wall of the carrier. Access to these compartments is through separate zipper closures in the edge wall of the liner. Molded-in leg protuberances also form other compartments for small items. Once removed from the car, the carrier serves as a suit case. Other embodiments are disclosed.

PATENTED FEB 23 1971

INVENTOR
PAUL BELOKIN, JR.
By Harbaugh and Thomas
Attorneys

INVENTOR
PAUL BELOKIN, JR.
By Harbaugh and Thomas
Attorneys

CAR CARRIER MEANS

BACKGROUND OF THE INVENTION

The car trunk lid carriers and the car top carriers of the prior art generally comprise rectangular receptacles which may be enclosed or have an open top and are supported on suction cups at the four corners with straps or hooks provided to affix the carrier to the edges of the trunk lid or the rain gutter of the car. Bonitt Pat. No. 3,215,232 describes a carrier formed of spaced rods with the suction cups mounted on threaded legs received in tubular corner posts. This carrier, although providing for vertical adjustment at the corners thereof is suitable only for carrying luggage and bulk items and must be provided with some kind of canvass cover for protection of the contents from the elements. Harris Pat. No. 2,714,480 discloses a luggage carrier in the form of a shallow tray constructed of sheet metal which has an open top and is also subject to the foregoing objections. The sleeping compartment shown in Cence Pat. No. 2,811,725 has a post member, extendable canvass sides and a roof member. Hinge supports are used to hold the roof and post member in spaced relationship to accommodate a person. The art also shows complicated carrier structures which are combinations of receptacles and a cover that function as a boat wherein brackets and hinges are necessary to hold the boat in place as a roof for the device. Other patentees disclose streamlined enclosed luggage carriers constructed of sheet aluminum and having varieties of openings or compartments including slidable drawers and the like for the storage of bulky items. Piano hinges or rubber gasket seals are used around the edges of the doors and openings to provide access and exclude dust and water. A variety of harness arrangements are disclosed in the art to hold carriers to horizontal surfaces of a vehicle.

SUMMARY OF THE INVENTION

The invention concerns the provision of a weatherproof molded carrier having the appearance of a suit case having a flexible dustproof liner with a side panel opening and compartments, both within the liner and between it and the inside walls of the molded carrier. The unit can be used as a suitcase and is adapted to be attached to a car trunk lid or car top as a carrier. A characteristic of the invention is the side panel hinge arrangement and the use of the liner as the means for hingedly holding the side panel thereto.

DESCRIPTION OF THE DRAWINGS

An illustrative embodiment of the invention is shown in the drawings, wherein.

THE PREFERRED EMBODIMENT

Figure 1:
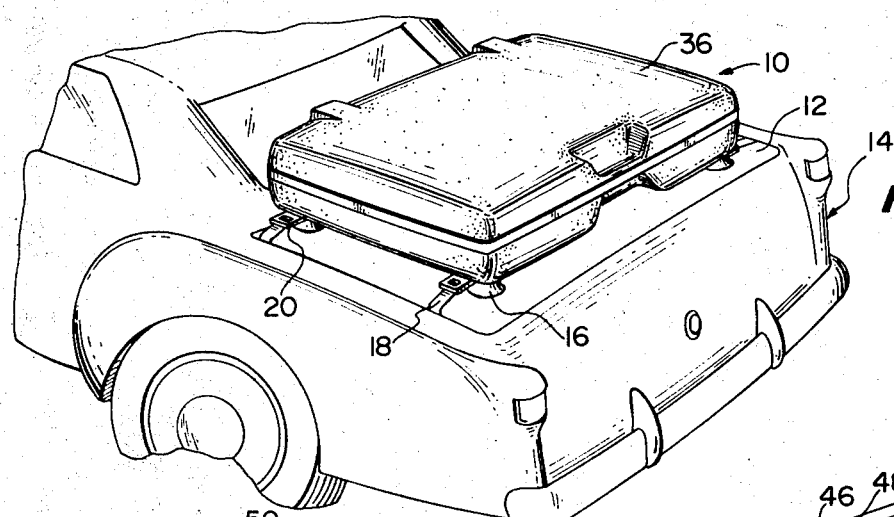
FIG. 1 is a perspective view of the carrier attached to the trunk lid of an automobile, partially shown.

Referring to the drawings the carrier 10 of this invention is shown in FIG. 1 affixed to the trunk lid 12 of the car 14 by means of the suction cups 16 and the straps 18 extending from the corner brackets 20.

Figure 6:
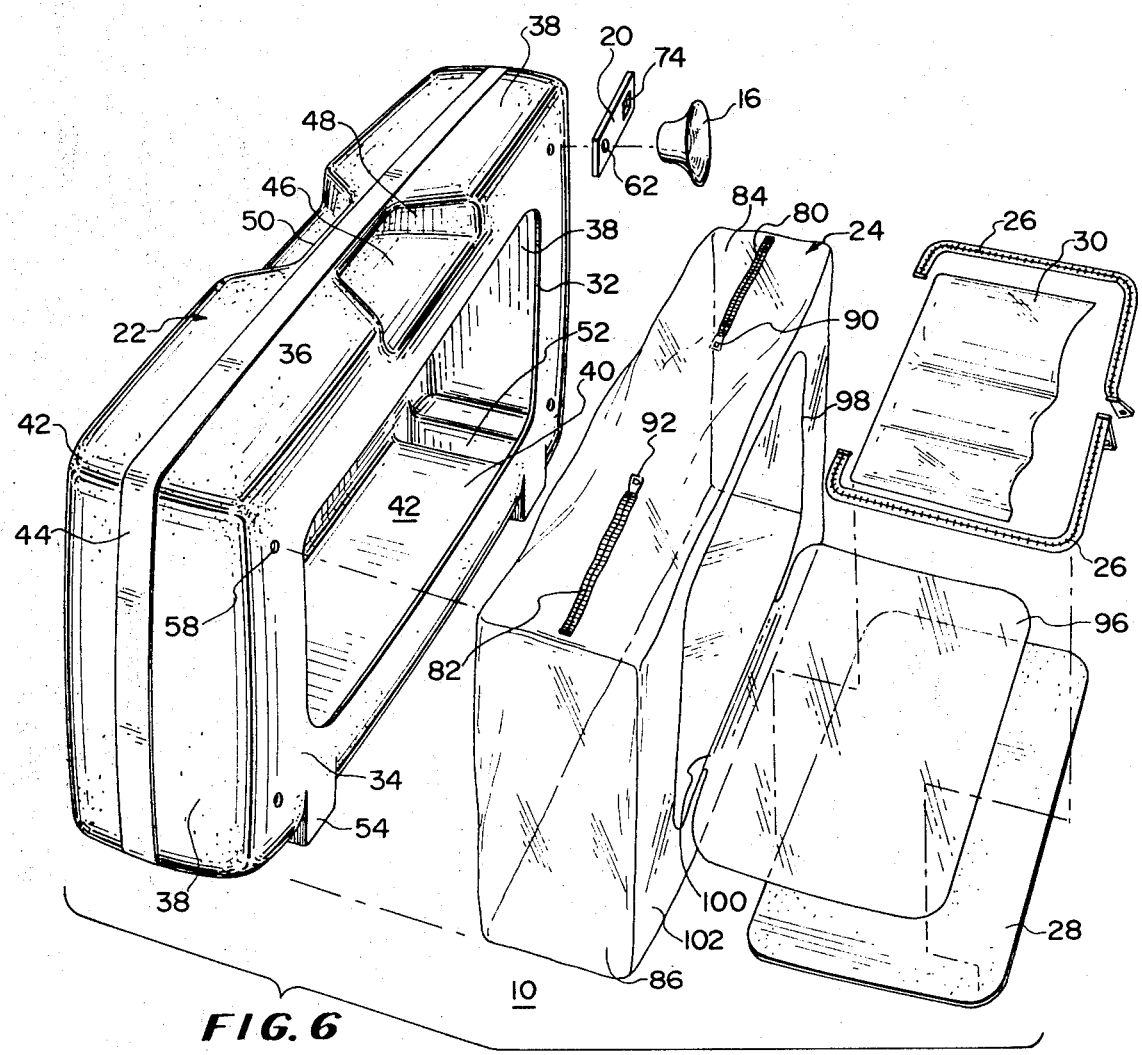
FIG. 6 is an exploded view of the various parts of the carrier.

For an initial understanding of the invention, the carrier parts are shown in FIG. 6 to comprise the molded one-piece case 22, the brackets 20, the suction cups 16, the liner 24, the zippers 26, the molded door panel 28 and the side pocket panel 30. The structure of these parts and their relationship in the assembly are as follows.

The case 22 and the door panel 28 are injection-molded from any suitable plastic as one piece with the edge 32 being a thinner section of the wall 34 outlining the door panel 28 which is cut therefrom. The wall 36 opposite to the wall 34 is continuous and, of course, integral with the edge walls 38 and the bottom wall 40, together defining the interior space 42 of the case.

The case 22 is formed with rounded corners 42 and has a circumferential indentation, not shown, into which is affixed the bright metal trim strip 44. The edge wall 38 has the molded-in depression 46 extending across to both walls 34 and joining the edge wall 38 by the sidewall 48. The walls 48 are shown to incline toward and round into the integral handle 50 which bridges the depression 46. The bottom wall 40 has the molded-in-compartments 52 forming the legs 54, the bottom surfaces 56 (FIG. 2) of which are coplanar and flat so that the case will stand firmly on a flat surface.

Figure 7:
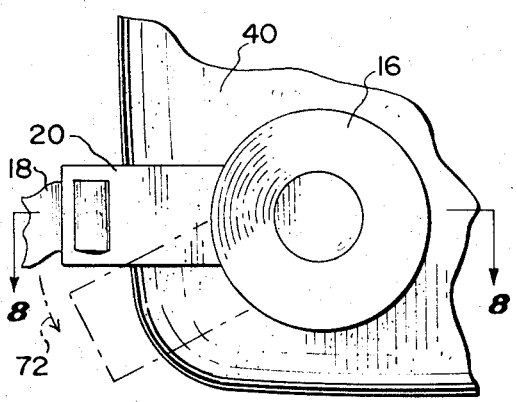
FIG. 7 is a fragmentary plan view of a corner of the carrier.
Figure 8:
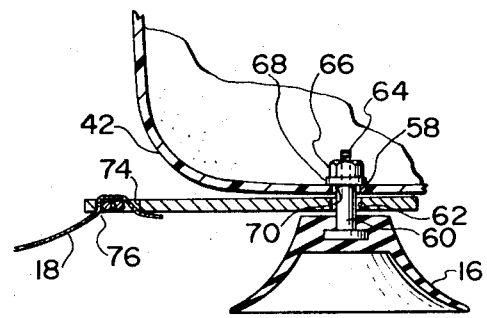
FIG. 8 is a fragmentary cross-sectional view taken along the lines 8-8 of FIG. 7.

The sidewall 34 has the corner holes 58 for mounting the suction cups 16 and the brackets 20 as shown in FIG. 8. The suction cups have a bolt 60, the head of which is molded into the thickened base of the cups and the shank extends through the aperture 62 of the brackets, through the holes 58 and has the threaded end 64 on the inside to receive the nut 66 and the washer 68. The bolt 60 has a shoulder 70 against which the washer 68 seats so that when the nut is tightened the bracket 20 is not compressed by or against the cup 16 and is free to swivel and be positioned at any desired angle, as shown in FIG. 7 by the arrow 72. The bracket 20 has the double slot 74—76 at the extended end to receive the strap 18 in an adjustable manner as is known in the art. Rubber covered flat hooks, not shown, are provided on the other ends of the straps to engage the edge of the trunk lid 12.

Figure 2:
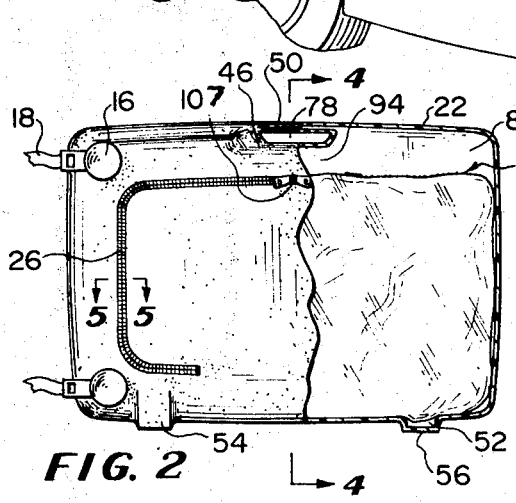
FIG. 2 is a bottom plan view partially in section to show the closed position of the side panel door.

As shown in FIG. 2, the handle 50 bridges the depression 46 in the wall 38 to form the space 78 therebetween to receive the fingers of the hand in carrying the case. The handle 50 is positioned at a midpoint of the wall 38 for balance in handling the case.

The liner 24, (see FIG. 6) is essentially rectangular in configuration and has the zippers 80 and 82 in the top wall 84. The zippers 80 and 82 are shown in closed position and can be of any desired length. The liner 24 fits within the space 42 of the case 22 with its walls 86 against the inner surfaces of the case, except the top wall 84 which is spaced from the wall 38. This defines the interior compartments 88 on each side of the handle 50, same being accessible by opening the zippers 80 and 82 on each side of the handle. Thus, the top wall 84 of the liner 24 becomes the bottom wall of the compartments 88, in the attitude shown in FIG. 2 and the zippers are means of access to the compartments from within the liner. The zippers 80 and 82 have their tabs 90 and 92 within the interior of the liner 24 so that they can be opened from the inside. The zippers can have double tabs, if desired, one on each side of the wall 84. Additional space 94 can be provided between the top wall 84 of the liner and the depression 46, also accessible by opening one or both of these zippers, 90 and 92.

Figure 3:
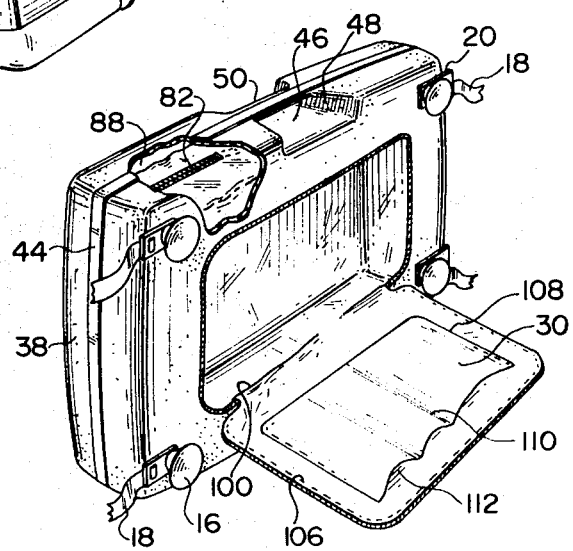
FIG. 3 is a perspective view of the carrier sitting on edge with the side panel open.
Figure 4:
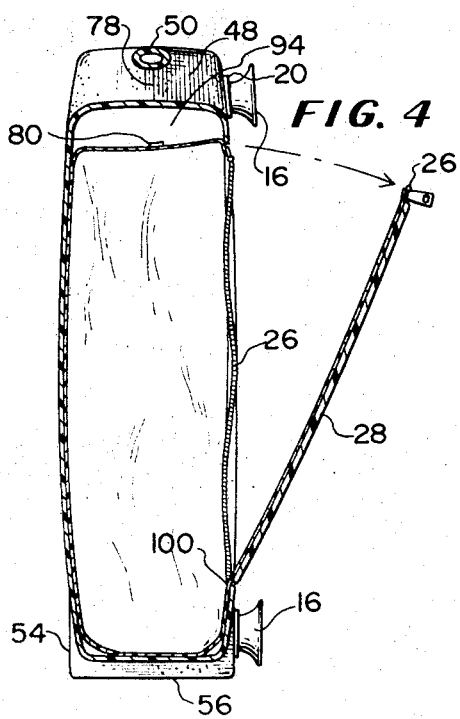
FIG. 4 is an enlarged cross-sectional view taken along the lines 4-4 of FIG. 2.
Figure 5:
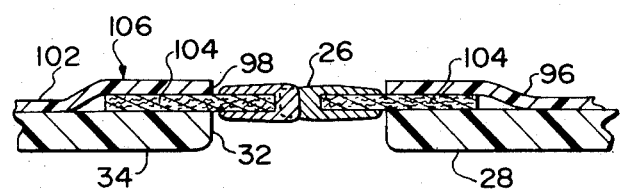
FIG. 5 is a fragmentary cross-sectional view taken along the lines 5-5 of FIG. 2.

The liner 24 is constructed of any flexible material such as cloth, canvass of plastic. Preferably, the liner 24 is constructed of tough transparent plastic sheet material, such as polyethylene and is a one piece unit with an integral side panel or door covering flap 96 cut out along the edge 98 to conform in shape and size with the opening defined by the edge 32 of the case 22. The cut edge 98 is discontinuous leaving the portion 100 attached to the wall 102 to serve as a hinge. The flap 96 is joined at its margin to the cloth web 104 of the zippers 26 by heat sealing or stitching 106 and to the flap 96 and door panel 28 in the same manner as shown in FIG. 5. The zippers 26 terminate or join at the opposite ends of the hinge 100. The zippers 26 are identical and essentially the same length so that when the panel 28 is hinged to the closed position shown in FIG. 2, the zipper tabs meet at the point 107 adjacent the handle 50. The pocket panel 30 is heat sealed on the inside of the flap 96 along the marginal line 108 and intersecting lines 110 to form pockets 112 therebetween to carry smaller articles. FIG. 4 shows the panel 28 unzipped and being opened to the position shown in FIG. 3. The liner 24 can be fastened on the inside of the case 22 in any desired manner such as heat sealing at strategic points along the walls or it can be left free inside the case.

In one embodiment the liner 24 is affixed to the inside of the wall 36 by the use of a suitable adhesive or heat sealing. Any form of slide fastener means can be used. In place of the slide fasteners, snap fasteners can be used if desired.

The case 22 is preferably blow-molded from a tough plastic, such as polystyrene and reinforcing fiber or fillers can be used to add to the strength of the luggage carrier. It is seen that since the door panel 28 is on the bottom of the case member 22 in the position shown in FIG. 1 and thus contiguous to the trunk lid 12, the contents would be protected from the elements. A loose panel of flexible plastic, larger than the door panel 28 can be provided to be inserted into the opening after clothes etc. are placed inside the liner 24, to provide additional sealing against dust. One edge of this additional panel can be heat sealed to the inside of the liner 24.

I claim:

1. A luggage carrier for attachment to a top surface of an automobile comprising:
   a. a case member having integral side, end and top and bottom walls,
   b. a recess in one of said sides with a handle member over said recess;
   c. a pair of legs extending from the side opposite said handle,
   d. an opening in said bottom wall,
   e. a door panel conforming to said opening and having an outer edge spaced from the edge of said opening on four sides thereof,
   f. a flexible liner within said case member, the walls of said liner being contiguous to the walls of said case member at said top, two of said ends and bottom walls, said liner having a sidewall spaced from the one sidewall of said case member having said recess,
   g. a flexible panel in the bottom wall of said liner, said panel being attached to and conforming to the configuration of said door panel and having an integral hinge member along one edge, and
   h. slide fastener means between said door panel and said opening in said bottom wall of the case member.

2. A luggage carrier in accordance with claim 1 in which:
   a. the sidewall of said flexible liner is spaced from the wall of said case member having said recessed handle to form storage compartments on each side of said handle, and
   b. slide fastener means in the sidewalls of said flexible liner to provide access to said storage compartments.

3. A luggage carrier in accordance with claim 1 in which; said legs in said case member are hollow molded members open to the inside of said case member to provide storage compartments between said flexible liner and the inside of said case member.

4. A luggage carrier in accordance with claim 1 in which; means are provided in the corners of said bottom wall for attachment of said case to the top surface of an automobile.

5. A luggage carrier in accordance with claim 4 in which:
   a. said attachment means comprise a suction cup, and
   b. a pivotal bracket member with strap means for engagement with a structural member of said automobile.

10. A luggage carrier in accordance with claim 5 in which:
   a. said suction cups are provided with an upstanding bolt adapted to be received in a bore hole through said bottom wall,
   b. a shoulder on said bolt to space said suction cup from said bottom wall, and
   c. said bracket member is pivotally mounted from said bolt in the space between said suction cup and the bottom wall of said case member.

7. A luggage carrier in accordance with claim 1 in which; a separate panel of flexible material is affixed at its edges to the flexible panel in the bottom wall of said liner to form a pocket therein having an open top and a closed bottom at said integral hinge.

8. A luggage carrier in accordance with claim 1 in which; said flexible liner is affixed to the inside top wall of said case member.